Nov. 5, 1929. I. I. STONE Re. 17,479

CENTERING CHUCK FOR WEB ROLLS

Original Filed March 19, 1925

Inventor:
Irving I. Stone
By Jones Addington Ames & Seibold
Attys.

Reissued Nov. 5, 1929

Re. 17,479

UNITED STATES PATENT OFFICE

IRVING I. STONE, OF CHICAGO, ILLINOIS

CENTERING CHUCK FOR WEB ROLLS

Original No. 1,605,997, dated November 9, 1926, Serial No. 16,803, filed March 19, 1925. Application for reissue filed April 23, 1927. Serial No. 186,131.

This invention relates to a device for supporting and centering the end of a web roll in position to feed the web to a newspaper printing press.

The principal objects of the invention are to provide means for supporting each end of the web roll from a pair of centers in a firm manner so that the web can be taken from the roll in the usual way and when exhausted the roll can be removed expeditiously by a very simple movement of the supporting spindle and the mounting of the roll will be correspondingly facilitated. The invention also involves means for eliminating all ferrules within the spools and reducing friction when desirable.

Other objects and advantages of the invention will appear hereinafter.

Reference is to be had to the accompanying drawings, in which.

Figure 1:
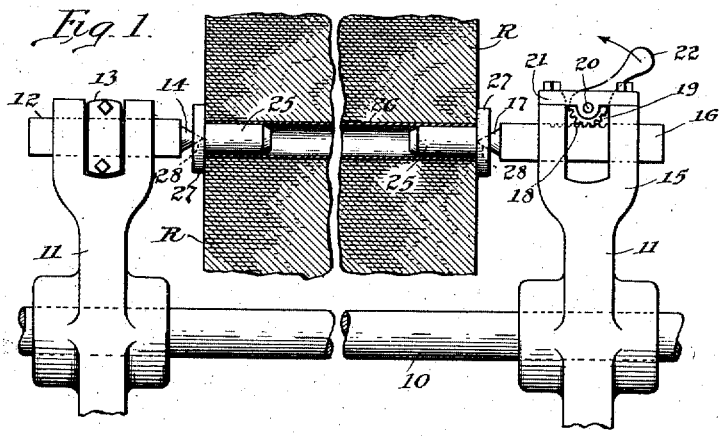
Figure 1 is a side view of a reel provided with a preferred embodiment of this invention showing it in operative position.
Figure 3:
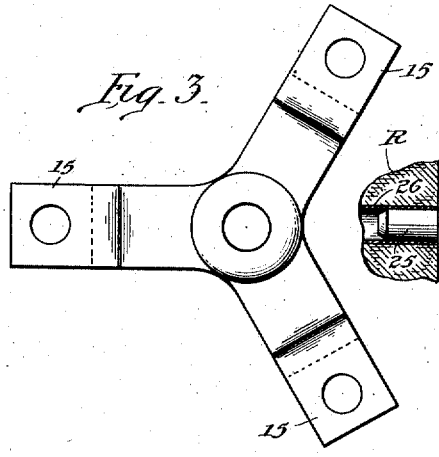
Fig. 3 is an end view of the reel.
Figure 2:
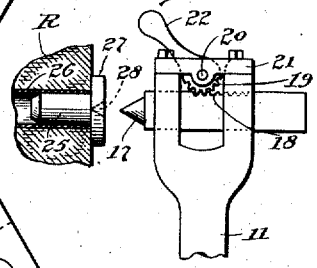
Fig. 2 is a fragmentary view of one end of the reel showing the way of dismounting the spool of the exhausted roll.

This invention is intended to be used with the reel comprising a shaft 10 and spiders 11 for supporting a plurality of web rolls R in a paper feeding device for a newspaper printing press. The spiders are formed with whatever number of arms is required to support the desired number of rolls around the shaft 10. It will be understood that the shaft 10 is turned from time to time to bring a new roll up to web delivering position and to permit the core or spool of the old roll to be removed at another point, as is usual in this art.

Each of the arms of the spider at one end of the reel is provided with a non-reciprocable steel spindle 12 fixed to each arm by a split collar 13. This spindle has a convex, and preferably conical, center 14 for receiving the roll at one end.

At the other end of the reel the corresponding arms are provided with hollow bearings 15 in which are mounted reciprocable spindles 16 provided with conical centers 17 corresponding with the centers 14 previously described. Each of these latter spindles is provided with a rack 18 or the like with which meshes a gear or pinion 19 on a shaft 20 carried on a bracket 21 fixed to the arm 11. The shaft is provided with a handle 22 which can be swung from the full to the dotted line position in Fig. 1 for the purpose of reciprocating this spindle to hold or release the web roll. It will be understood, of course, that in the form shown there are three pairs of spindles arranged for the support of three web rolls around the shaft 10, although any other convenient number can be employed.

For the purpose of supporting the roll R on the conical centers 14 and 17 I provide a pair of chucks 25. Each of these is made with a solid cylindrical shank which for an ordinary sized web roll can be about eight inches long. The shank is beveled off at the inner end and is intended to be inserted in the ends of the spools 26 on which the roll is wound. As illustrated in the drawing, these spools 26 may be of extremely light construction, it being usual, in practice, to wind spirally and to glue together two thicknesses of ordinary light cardboard, whereby the manufacturing cost thereof is so small that the spools may be discarded or destroyed after a single use thus eliminating the cartage and other cost of handling the spools of the prior art which latter must be returned to the paper plants for further use. Moreover, the cost of producing the spools of the prior art are comparatively excessive, being of a substantially heavy construction and being provided with ferrules. Each chuck is also provided with a cylindrical or other shaped flat flange 27 which is drawn up against the end of the web roll; that is, the edges of the paper. In the flange is a conical central depression 28 beveled to fit the conical centers 14 and 17. These chucks are made of solid pieces of metal or even wood, if so desired, and are placed in the ends of the spools of the rolls R before they are applied to the reel. The shanks are made to fit tightly in the ends of the spools.

In the application of the rolls, one end is lifted and located so that the center 14 enters the depression 28 in one of the chucks located in the roll. The other end of the roll is raised into substantially level position and then the handle 22 is moved over to push the spindle 16 toward the roll until the center 17 enters the depression 28 in the other chuck. On account of the construction shown, a forward movement of this spindle of only 2 inches is required in an ordinary newspaper printing press. To remove the spool of the exhausted roll the spindle 16 is drawn back by means of the rack and lever. This releases the roll and it can be removed very readily as can be seen. In this way the roll is very quickly applied and detached and no ferrules are required inside the spools. This results in economy in use.

As these so-called chucks have cylindrical shanks of substantial length which enter the spool on which the roll is wound, they support the roll firmly at each end and prevent its getting out of center although they do not extend through the roll and are not connected in any way with each other except by the spool in which they fit tightly. Thus, they constitute a firm and rigid support. In unwinding of the web, they of course rotate with it on the centers 14 and 17.

Although I have illustrated and described only a single form of the invention I am aware of the fact that modifications can be made therein by any person skilled in the art without departing from the scope of the invention as expressed in the claims.

Therefore I do not wish to be limited in these respects but what I do claim is:—

1. As an article of manufacture, a chuck for rigidly supporting the end of a web roll for a newspaper printing press comprising a shank of material length adapted to enter the spool of the web roll and provided with a central depression for receiving a pointed supporting center and with means limiting the extent to which the chuck will extend within the spool.

2. As an article of manufacture, a chuck for rigidly supporting the end of a web roll for a newspaper printing press comprising a cylindrical shank of material length adapted to enter the spool of the web roll and fit tightly therein and having a flange on the end fitting against the end of the web roll and provided with a central conical depression for receiving a conical supporting center.

3. A supporting means for a web roll comprising a pair of chucks each having a cylindrical shank of substantial length adapted to be fitted into the end of the spool on which the web roll is wound, each having a flange at the end engaging the end of the web roll, and each being provided with a central depression on the outer end for receiving a supporting center on which the two chucks can be rotated with the web roll in the unwinding thereof.

4. In a web roll support, the combination of a reel having pairs of arms rotatable therewith, a stationary conical center mounted on each arm at one end of the reel, a reciprocable conical center mounted on each arm at the other end of the reel, said centers being in axial alignment, means for reciprocating the movable centers independently of each other, a pair of chucks for directly supporting each web roll, each chuck having a depression in the end for receiving the two centers and each having a material portion of a cylindrical form extending into the end of the web roll for supporting the web roll at its ends and carrying it on said centers and means limiting the extent to which the chuck will extend within the roll.

5. As an article of manufacture, a chuck for rigidly supporting the end of a web roll for a newspaper printing press comprising a shank portion for entering a spool of said web roll and in engagement with a supporting portion, one of said portions having a central depression for receiving a pointed end of the other of said portions, and means for limiting the extent to which said chuck will extend within the spool.

In testimony whereof, I have subscribed my name this 21st day of April, 1927.

IRVING I. STONE.